(12) United States Patent
Pelletier et al.

(10) Patent No.: US 6,675,667 B1
(45) Date of Patent: Jan. 13, 2004

(54) GEARBOX WITH COTTERING

(75) Inventors: Laurent Pelletier, Cergy Saint Christophe (FR); Xavier Lelasseux, Suresnes (FR)

(73) Assignee: Peugot Citroen Automobiles SA, Neuilly sur Seine (FR)

( * ) Notice: Subject to any disclaimer, the term of this patent is extended or adjusted under 35 U.S.C. 154(b) by 7 days.

(21) Appl. No.: 10/070,299

(22) PCT Filed: Sep. 5, 2000

(86) PCT No.: PCT/FR00/02440
§ 371 (c)(1),
(2), (4) Date: Jun. 19, 2002

(87) PCT Pub. No.: WO01/18417
PCT Pub. Date: Mar. 15, 2001

(30) Foreign Application Priority Data

Sep. 6, 1999 (FR) .............................. 99 11123

(51) Int. Cl.[7] ................................................ F16H 3/08
(52) U.S. Cl. ..................... 74/333; 192/71; 192/93 C
(58) Field of Search ..................... 74/333, 371, 372, 74/357, 358, 363, 369; 192/71, 93 C; 475/269–292; 384/49, 51

(56) References Cited

U.S. PATENT DOCUMENTS

| | | | | |
|---|---|---|---|---|
| 2,861,461 A | | 11/1958 | Kreidler ..................... | 74/371 |
| 3,707,884 A | * | 1/1973 | Go ............................. | 74/372 |
| 3,812,735 A | * | 5/1974 | Von Kaler et al. ......... | 74/371 |
| 4,395,240 A | * | 7/1983 | Blanchard ................... | 440/86 |
| 5,086,896 A | * | 2/1992 | Murakami et al. ......... | 192/48.91 |
| RE34,736 E | * | 9/1994 | Hanaway ..................... | 384/49 |
| 5,445,044 A | * | 8/1995 | Lee ............................ | 74/372 |
| 5,570,608 A | * | 11/1996 | Miller ......................... | 74/325 |

FOREIGN PATENT DOCUMENTS

| | | | | |
|---|---|---|---|---|
| JP | 53086962 A | * | 7/1978 | ............. F16H/3/34 |
| JP | 56156541 A | * | 12/1981 | ............. F16H/3/08 |

OTHER PUBLICATIONS

Ulm M., Lacher, F., Graf F.: "Die elektrinische Getriebesteuerung 2000—Markt und technische Trends" VDE BERICHTE 1170, 1994, XP000863302, cite dans la demand p. 201, p. 218.

* cited by examiner

Primary Examiner—Rodney H. Bonck
Assistant Examiner—David D. Le
(74) Attorney, Agent, or Firm—Duane Morris LLP (57) ABSTRACT

The invention concerns a gearbox, comprising a hollow shaft (21) perforated with radial orifices (214, 215, 216); idling gears (44, 45, 46) mounted rotating on the hollow shaft (21), each of which has internal splines; a cottering rod (5) mounted mobile in translation in the hollow shaft (21); and rows of balls (64 to 66) arranged opposite the idling gears; the cottering rod having a radial protuberance (21) designed to be engaged, depending on the axial position of the cottering rod, the balls of either of the rows in the splines of the corresponding gear. The inventive gearbox comprises a cage (7) fixed in rotation relative to the hollow shaft (21) and arranged between said shaft and the idling gears, said cage (7) consisting of segments whereof only two can be, at any one time, spaced apart from each other to enable the balls of the corresponding row to be engaged in the splines of the corresponding gear.

10 Claims, 7 Drawing Sheets

_Fig. 8a_  _Fig. 8b_

_Fig. 9a_

_Fig. 9b_

FIG. 10

GEARBOX WITH COTTERING

The present invention pertains to a gearbox, typical of those in which the changes in ratios are obtained by moving a selector, or cottering rod, designed such that a hollow shaft is engaged in rotation with one of the gears of a series of gears mounted loosely on this shaft.

More precisely, the present invention pertains to a gearbox, comprising at least: one primary shaft and one secondary shaft, one of these shafts forming a first hollow shaft perforated by an axial bore; at least two pairs of gears, each of which comprises an input gear and an output gear which engage each other and which equip the primary and secondary shafts, respectively; a first cottering rod mounted mobile in the axial bore of the first hollow shaft and selectively adopting at least a first or second axial position; and a first set of balls comprising at least the first and second rows of balls; the input and output gears having between them, for two different pairs of gears, respective ratios that are different from each other, the first and second pairs of gears including the first and second idling gears, respectively, mounted rotating on the first hollow shaft, and each of which has internal splines, the first hollow shaft having the first and second rows of orifices emerging, respectively, opposite splines of the first and second idling gears, and in which are respectively engaged the balls of the first and second rows, and with the first cottering rod having a radial protuberance selectively engaging the balls of the first or second row in the splines of the first or of the second idling gear, according to which the first rod is in its first or its second axial position.

A gearbox of this type is described, e.g., in the document: Ulm, M., F. Lacher, and F. Graf: "The Electronic [sic] Gear Control 2000—Market and Technical Trends," VDI Reports 1170, 1994.

Despite the advantages that namely their simplicity provides, the prior-art gearboxes of this type are not reliable enough to be used on sedan motor vehicles, their application therefore being limited to two-wheel drive vehicles with relatively low power.

In this context, the object of the present invention is to propose a gearbox having a simple structure, but nevertheless having a reliability compatible with its application to four-wheel drive vehicles.

To this end, the gearbox of the present invention, otherwise in conformity with the generic definition that the above preamble gives it, is essentially characterized in that it comprises at least a first cage fixed in rotation relative to the first hollow shaft and arranged between the first hollow shaft and the first and second idling gears, in that this first cage consists of segments stacked according to one axial direction and defining between them a set of gaps comprising at least a first and a second gap opposite which are respectively arranged the balls of the first and second rows, in that the segments are mounted sliding according to the axial direction to permit each of the first and second gaps to selectively adopt a minimum width for which these first and second gaps block, respectively, the balls of the first and second rows to be engaged, respectively, in the splines of the first and second idling gears, and a maximum width for which the first and second gaps respectively enable the balls of the first and second rows to be engaged, respectively, in the splines of the first and second idling gears and in that the segments are mounted sliding with a total effective clearance less than twice the difference between the maximum and minimum widths, which results in that two different gaps never adopt their maximum width at the same time.

Thanks to such an arrangement, the gearbox of the present invention is protected against the risk that the balls might come out of their housing under the effect of the centrifugal force.

According to one possible embodiment of the present invention, the cage segments are, e.g., enclosed, according to the axial direction, between two pretensioned springs.

Preferably, the first and second pairs of gears include the first and second connected gears, respectively, engaging with the first and second idling gears, respectively, and integral in rotation with that of the first and second shafts which is not formed by the first hollow shaft.

If the primary shaft forms a first hollow shaft the secondary shaft may form a second hollow shaft and may itself carry at least two idling gears, this second hollow shaft being perforated with an axial bore in which are housed a second cottering rod, a second set of balls and a second cage which are respectively equivalent to the first cottering rod, the first set of balls and the first cage.

To economically increase the number of gears, the first hollow shaft may carry gears which are connected and are integral in rotation with this first hollow shaft.

If the gearbox comprises at least three pairs of gears and must permit the direct selection of a gear from a nonadjacent gear it may be suitable to provide that the different rows of balls of the first set of balls comprise at least a same certain number of balls, that the radial protuberance of the first cottering rod be at least traversed by axial notches in a number equal to the certain number of balls and each of which forms a housing for one ball, that the first cottering rod is connected in rotation, by the axial splines, to a phase control sleeve selectively mobile according to the axial direction, and that the phase control sleeve is itself connected in rotation to the first hollow shaft by a helical connection.

Moreover, it may thus be suitable to provide that the orifices made in the first hollow shaft at least be arranged in staggered rows.

To provide the gearbox with a reverse gear, one of the pairs of gears may comprise an input gear and an output gear, which only engage each other via a third gear, carried on an additional axis relative to the primary and secondary axes.

The output of the gearbox of the present invention may be optimized by providing that the idling gears carried by a same shaft are separated from each other by pin stops.

Finally, in a simple embodiment of the gearbox of the present invention, the segments of the first cage are, e.g., indexed in rotation with each other by means of cutouts and of complementary tongues engaged in these cutouts.

Other features and advantages of the present invention shall become more evident from the description provided below by way of indication and in a nonlimiting manner, with reference to the attached drawings, in which.

Figure 10:
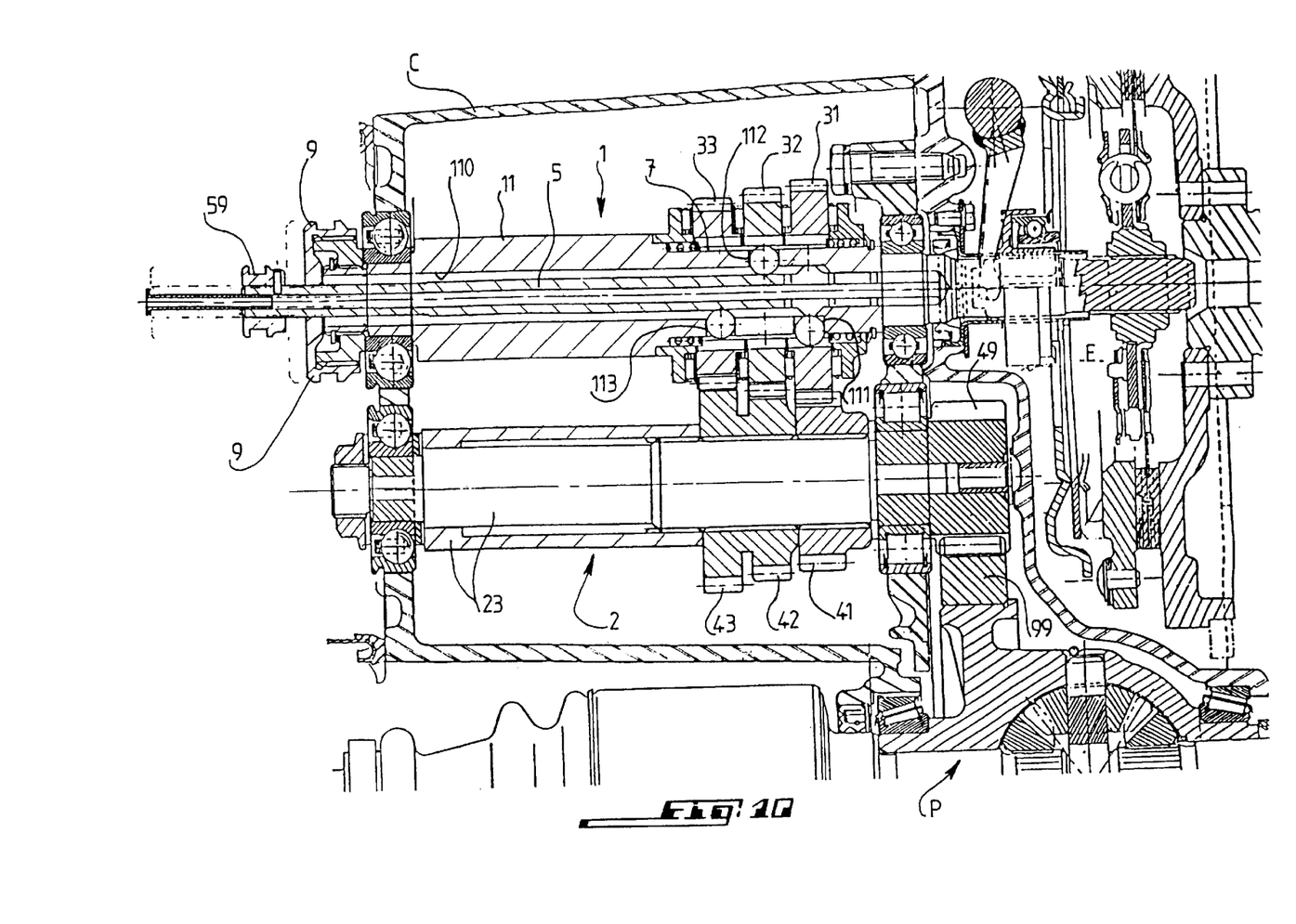
FIG. 10 is a partial sectional view of a gearbox according to a third embodiment of the present invention.

The present invention generally pertains to a gearbox, of which FIG. 10 gives a relatively simple and complete example, although also illustrating completely optional features.

Such a box classically comprises a device, here taking the form of a clutch E, ensuring its coupling with the engine, a primary shaft 1 which receives engine torque coming from the coupling device E and which carries a series of input gears 31, 32, 33, a secondary shaft 2 which carries, on the one hand, a series of output gears 41, 42, 43, one of which at most, at any one time, is entrained by a corresponding input gear, in this case by the gear 31, and, on the other hand, an output gear 49 engaging with the gear 99 for entraining the transmission point P of the vehicle.

Each of the shafts is classically mounted on bearings fixed to a housing C.

Figure 1:
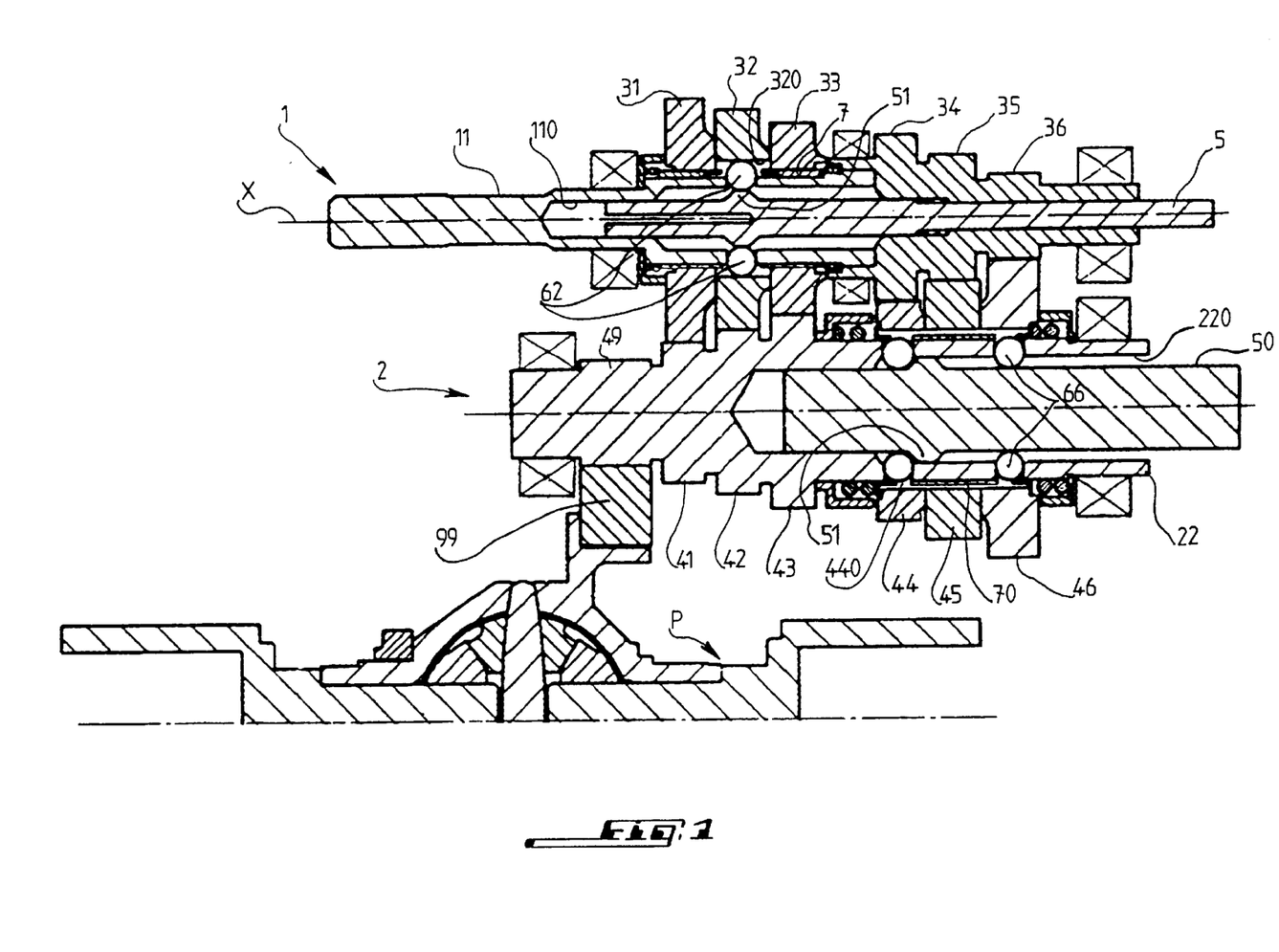
FIG. 1 is a partial sectional view of a gearbox according to a first embodiment of the present invention.
Figure 2:
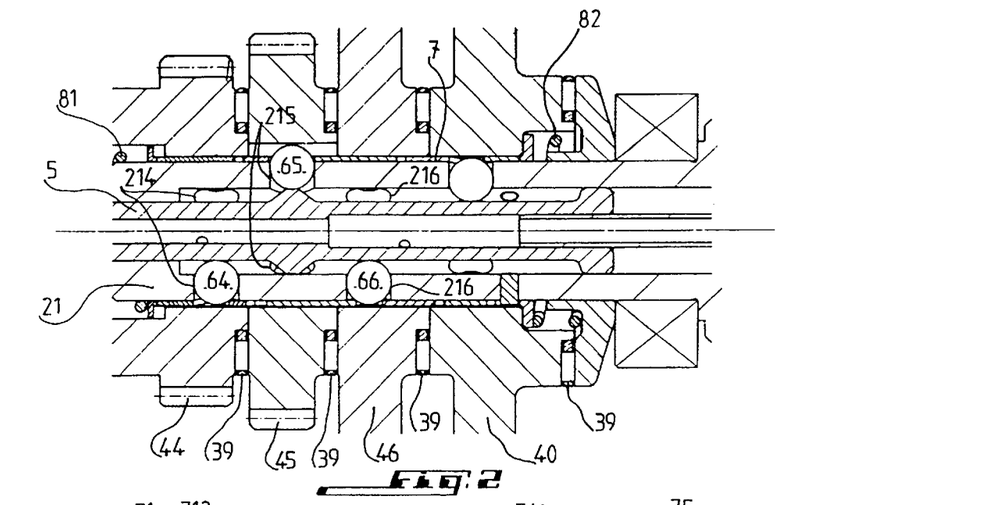
FIG. 2 is a partial sectional view of a detail of a gearbox according to the present invention.
Figure 7:
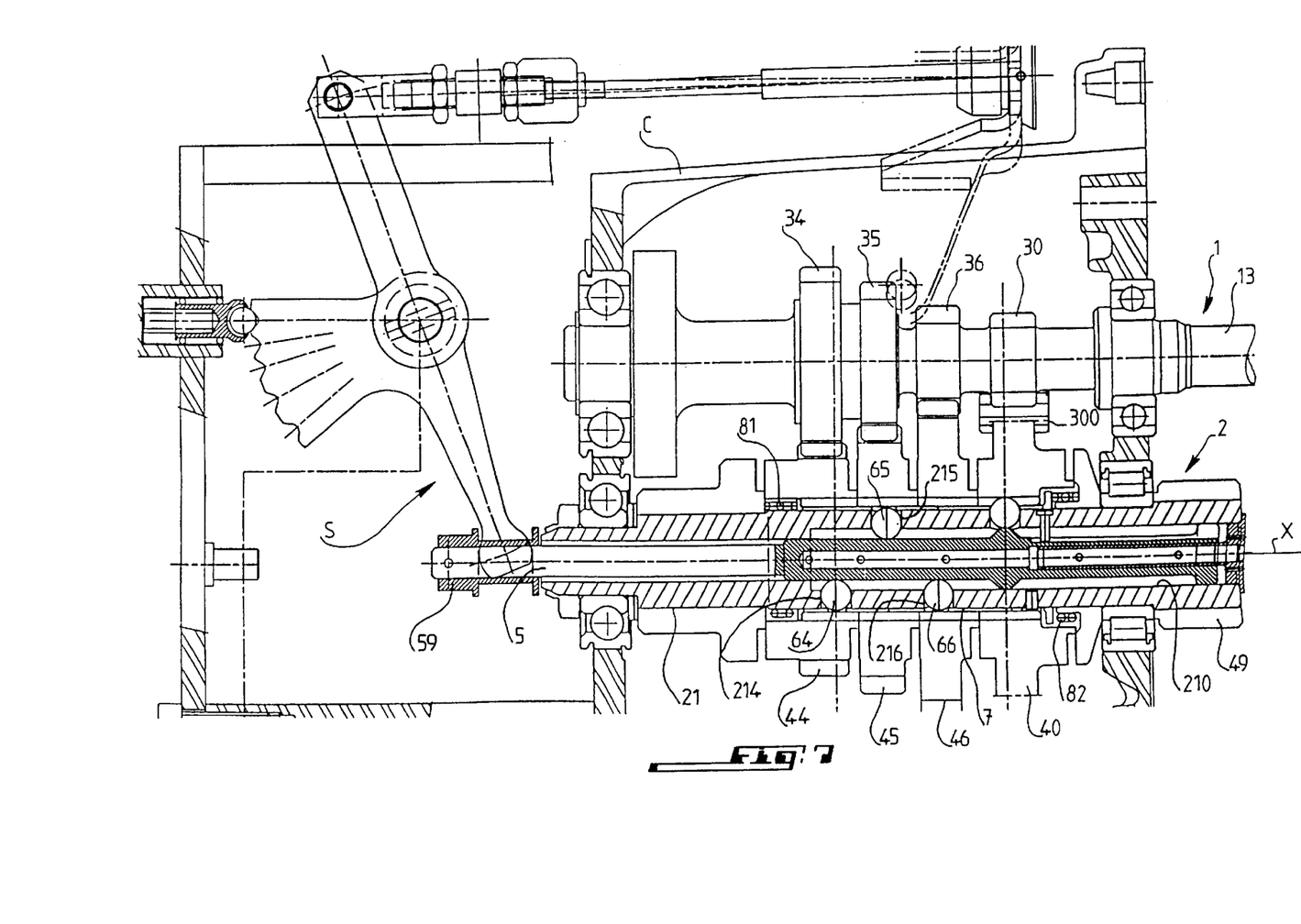
FIG. 7 is a partial sectional view of a gearbox according to a second embodiment of the present invention.

One of the primary 1 and secondary 2 shafts forms a first hollow shaft, perforated with an axial bore, such as 110 (FIGS. 1, 10, 11) or 210 (FIGS. 2 and 7).

By agreement, the first hollow shaft shall be considered to be formed by the primary shaft 1, and designated by the reference 11 (FIGS. 1, 10, 11), when this primary shaft comprises all of the features defining this first hollow shaft and therefore is not formed, e.g., by a full shaft, such as the shaft 13 in FIG. 7, the secondary shaft 2 thus being able itself to either form a second hollow shaft 22 created in accordance with the teaching of the present invention (FIGS. 1 and 11), or form any shaft, such as the full shaft 23 in FIG. 10.

On the other hand, the first hollow shaft shall be considered to be formed by the secondary shaft 2 and designated by the reference 21 (FIGS. 2 and 7) when this secondary shaft comprises all the features defining this first hollow shaft, while the primary shaft 1 is created differently, such as, e.g., the shaft 13 in FIG. 7.

Moreover, the gearbox comprises a plurality of pairs of gears, such as 31, 41 through 33, 43 (FIG. 10), 34, 44 through 36, 46 (FIG. 7), or 31, 41 through 36, 46 (FIGS. 1 and 11), each pair of gears comprising an input gear, such as 31 through 36, and an output gear, such as 41 through 46, and the input and output gears of a same pair engaging each other and equipping the primary 1 and secondary 2 shafts, respectively.

A ratio, represented by the ratio of the number of teeth of the input gear to the number of the teeth of the corresponding output gear, corresponds to each pair of engaged gears, and the pairs of engaged gears are arranged in rows such that two different pairs of gears have respective different ratios from each other and that the ratios of the different pairs advance in a monotonous manner according to the axial direction X of the first hollow shaft 11, 21.

Figure 5:
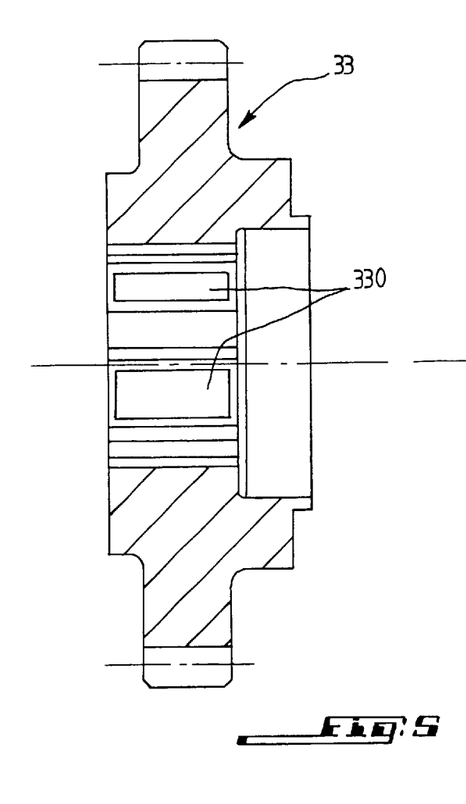
FIG. 5 is an axial sectional view of an idling gear that can be used in a gearbox according to the present invention.
Figure 6:
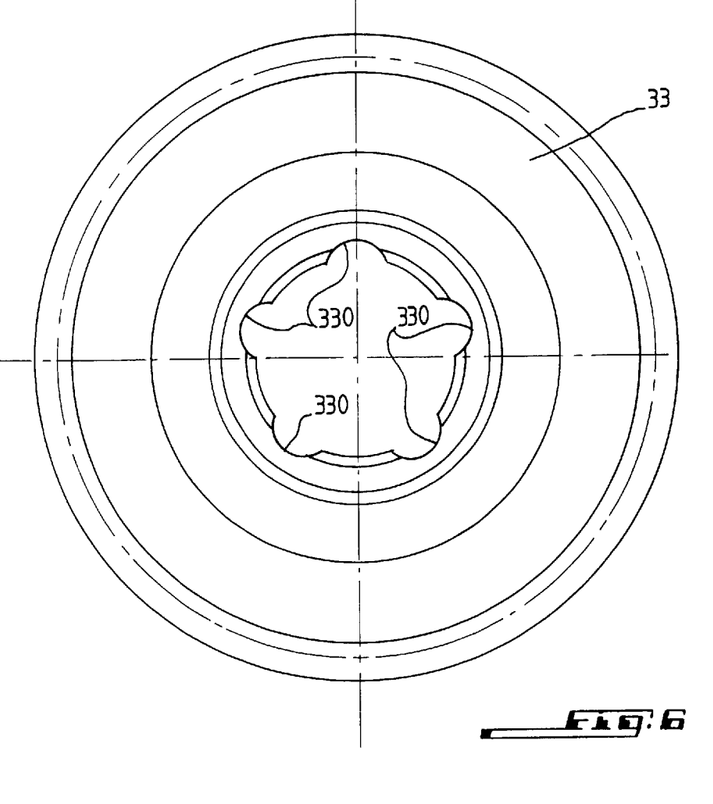
FIG. 6 is a front view of the idling gear shown in FIG. 5.

Moreover, each of the pairs of engaged gears comprises an idling gear, such as 31 through 33 and 44 through 46, mounted rotating on the first hollow shaft 11, 21 or on the second hollow shaft 22 (FIG. 7) and having corresponding internal splines 310 through 330 (FIGS. 5 and 6) and 440 through 460, the other gear of each pair consisting of a connected gear, such as 34 through 36 and 41 through 43, which is integral in rotation with the shaft that carries it.

A cottering rod, such as 5 or 50, provided with a radial protuberance 51, is mounted mobile in the axial bore 110, 210, or 220 of each hollow shaft 11, 21, or 22 to be able, in response to a gear change command, to go from a first axial position to a second axial position.

Each cottering rod 5, 50, is, e.g., controlled in translation in the corresponding hollow shaft by a selection mechanism, such as 8 (FIG. 7) which maneuvers a translation control sleeve 59 that is integral with this rod.

Each hollow shaft 11, 21, 22 is perforated with a plurality of radial orifices, such as 111 through 113 (FIG. 10), 214 through 216 (FIG. 7), and 224 through 226 (FIG. 11), arranged in rows, such as 62 (FIG. 1) and 64 through 66 (FIG. 2), the orifices of each row emerging opposite the internal splines of a same idling gear, such as 31 through 33 and 44 through 46.

Each hollow shaft 11, 21, 22 comprises a set of balls, such as 6 and 60 (FIG. 11), each ball being housed in one of the radial orifices of this shaft, and the balls of a same set being therefore arranged in rows as are these radial orifices.

Thanks to the axial mobility of each cottering 2 rod 5, 50, the radial protuberance 51 of this rod may be conveyed opposite any of the rows of balls housed in the corresponding hollow shaft, in which case the balls of this row are pushed by the radial protuberance 51 into the radial orifices of this row, until being engaged at any one time in these orifices and in the internal splines of the idling gear arranged opposite this row, this movement ensuring the cottering of this gear on the hollow shaft and thus making this gear temporarily fixed in rotation relative to this shaft.

Moreover, the gearbox according to the present invention comprises, in each hollow shaft, such as 11, 21 or 22, a cage, such as 7 or 70, which is fixed in rotation relative to this shaft and which is arranged between this same shaft and the idling gears that it carries.

Figure 3:
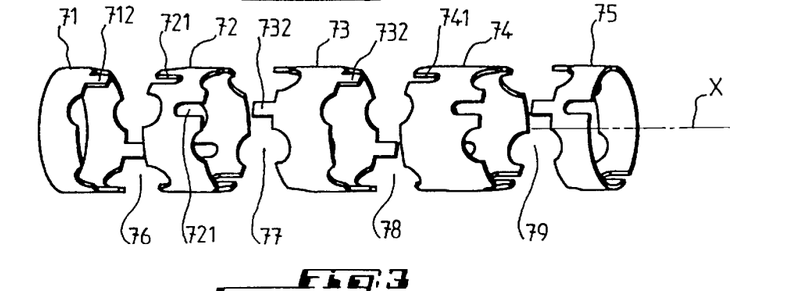
FIG. 3 is an exploded perspective view of a cage that can be used in a gearbox according to the present invention.
Figure 4A:
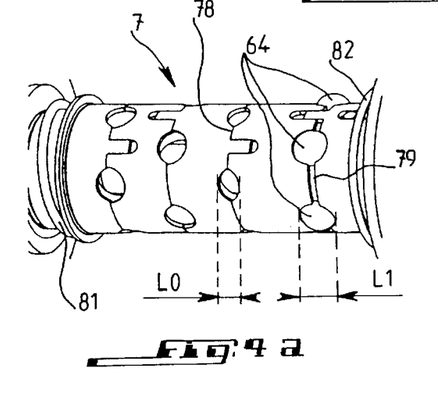
FIG. 4a is a perspective view of the exterior of a cage that can be used in a gearbox according to the present invention and represented in a first configuration.
Figure 4B:
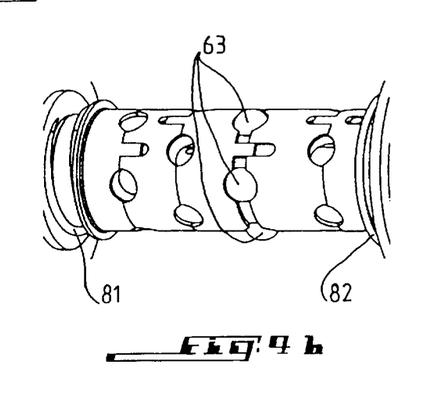
FIG. 4b is a perspective view similar to FIG. 4a, but in which the cage is represented in a second configuration.

Each cage 7, 70 (FIGS. 3, 4a, 4b) consists of segments, such as 71 through 75, which are stacked according to the axial direction X of the corresponding hollow shaft, and these segments define between them a set of gaps, such as 76 through 79, each of which receives one of the rows of balls, these segments preferably having rounded inside recesses forming, by pairs, housings for the balls as shown in FIGS. 4a and 4b.

The segments 71 through 75 are mounted sliding according to the axial direction X to permit each of the gaps 76 through 79 to adopt, selectively, either a minimum width L0 (FIG. 4a), e.g., measured at the rounded inside recesses, for which this gap blocks the balls of the corresponding row to be engaged in the splines of the corresponding idling gear, or a maximum width L1 for which this gap enables the balls of this row to be engaged in the splines of the corresponding idling gear.

The segments 71 through 75 are mounted sliding with a total effective clearance, such that two different gaps 76 through 79 never adopt their maximum width L1 at the same time.

"Total effective clearance" is defined here as the maximum total axial distance that the end segments 71 and 75 can practically travel relative to each other, this distance having to be less than that which would be necessary for two rows of balls, such as 64 in FIG. 4a and 63 in FIG. 4b, to be able, at the same time, to project into the respective internal splines of two different idling gears, mounted on a same hollow shaft.

Such as the maximum L1 and minimum L0 widths are defined, this clearance must therefore be at least equal to the difference L1−L0, but less than the quantity 2×(L1−L0), i.e., less than twice the difference between the maximum and minimum widths.

Although a possible solution consists of simply mechanically limiting the clearance to this range of values, it may be more advantageous to provide that the cage segments 71 through 75 are enclosed, according to the axial direction X, between two pretensioned springs 81, 82, with the clearance thus being limited by the efforts of axial compression exerted on the stack of segments, and which prevent a ball from being able to remain engaged in the spline of a gear, when it is not pushed radially by the protuberance 51 of the cottering rod 5 or 50.

As is stated above, each of the cages 7, 70 is made integral in rotation with the hollow shaft that carries it.

To this end, each segment 71 through 75 and the corresponding hollow shaft may have an axial groove and a complementary rib cooperating with each other.

According to another variant, shown namely [in] FIG. 3, it is possible to see to it that only the end segments 71 and 75 are integral in rotation with the shaft that carries them, and that the different segments making up the cage 7 are indexed in rotation with each other by means of cutouts such as 721, 741 and complementary tongues 712, 732, engaged in these cutouts 721, 741.

As FIG. 3 also shows, the rounded inside recesses of the cage, which form housings for the balls, as well as the radical orifices such as 214, 215, 216 (FIG. 2) made in the corresponding hollow shaft can be arranged in staggered rows, not only to optimize the balancing of this shaft, but also to make the means for using easier, which will be described below, to permit a nonsequential passage of the gears.

Figure 11:
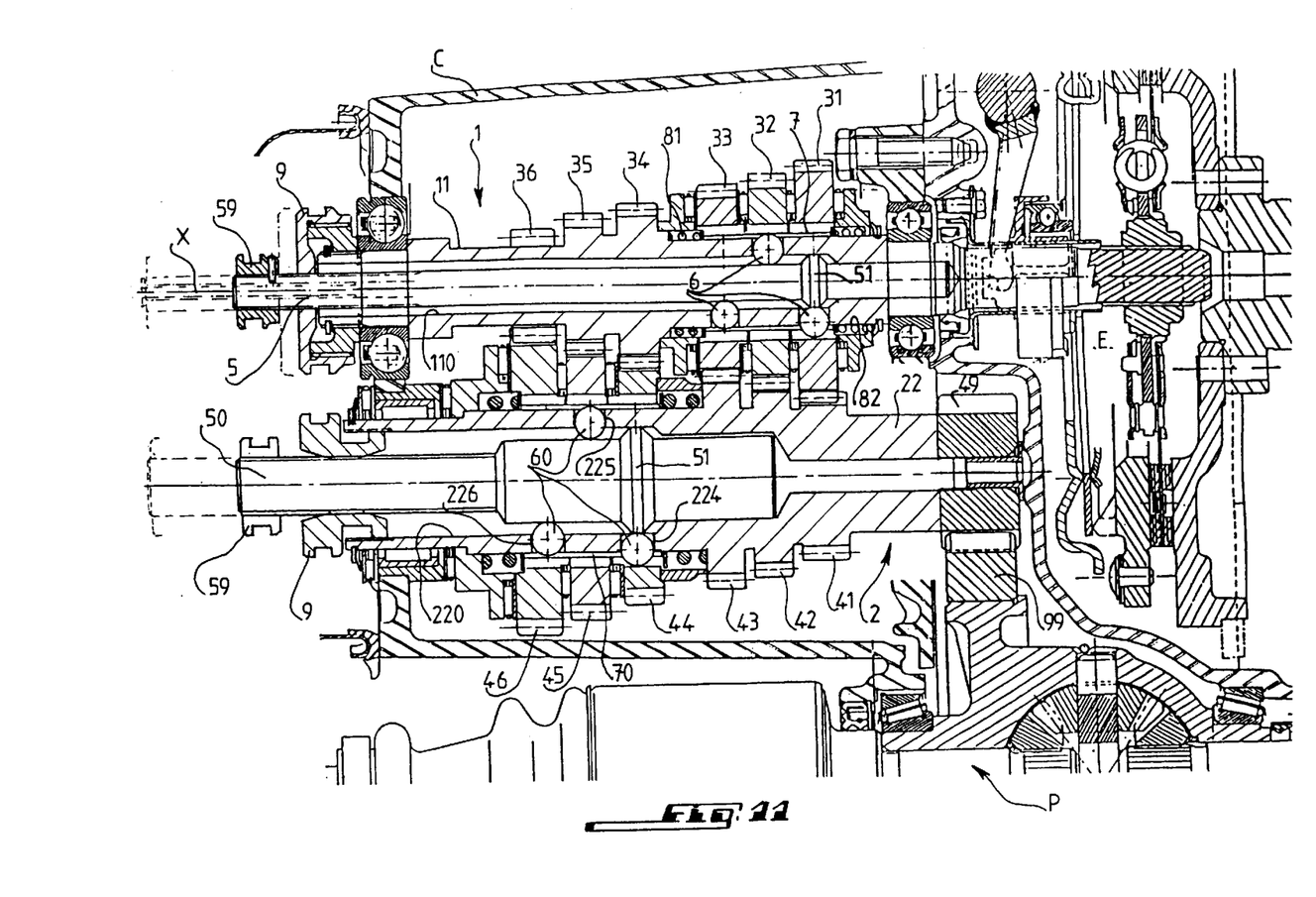
FIG. 11 is a partial sectional view of a gearbox according to a fourth embodiment of the present invention, represented in the blocked position for parking the vehicle.

When the primary and secondary shafts 1 and 2 form the respective first and second hollow shafts, each of them, as FIGS. 1 and 11 show, preferably carry, at any one time, idling gears and connected gears, the idling gears 31, 32, 33 and 44, 45, 46 carried by a same shaft 11, 21 being, moreover, advantageously separated from each other by pin stops 39 to increase the output of the gearbox in all the embodiments of the present invention.

To provide the gearbox of the present invention with a reverse gear, it is possible to provide, as FIG. 7 shows, that one of the pairs 30, 40 of gears comprises an input gear 30 and an output gear 40, one of which is idling and the other connected, these gears only engaging with each other via a third gear 300 carried by an auxiliary shaft and permitting the input and output gears to rotate in the same direction.

Figure 8A:
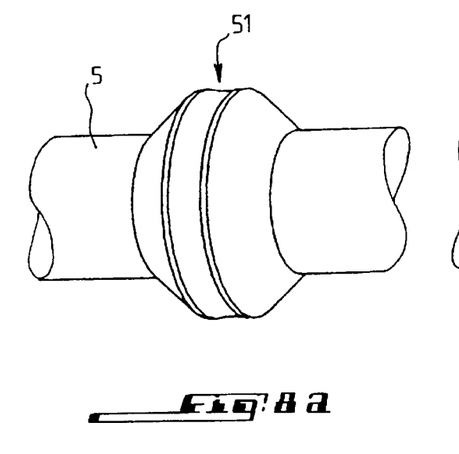
FIG. 8a is a partial perspective view of a first possible embodiment variant of a cottering rod that can be used in the gearbox of the present invention.

The box, as described up to now, may use a cottering rod, whose radial protuberance 51 has the shape of two truncated cones assembled by their base and separated by a more or less cylindrical surface, as shown in FIG. 8a.

Figure 8B:
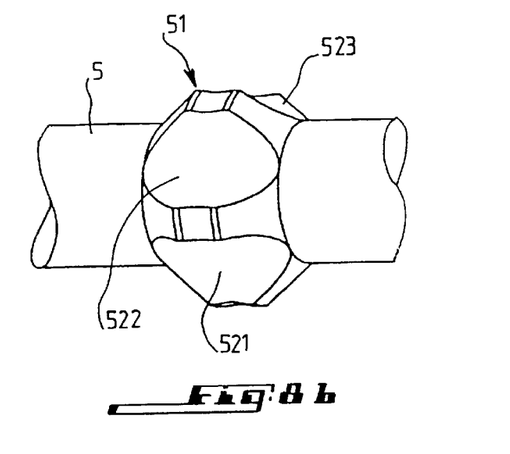
FIG. 8b is a partial perspective view of a second possible embodiment variant of a cottering rod that can be used in the gearbox of the present invention.
Figure 9A:
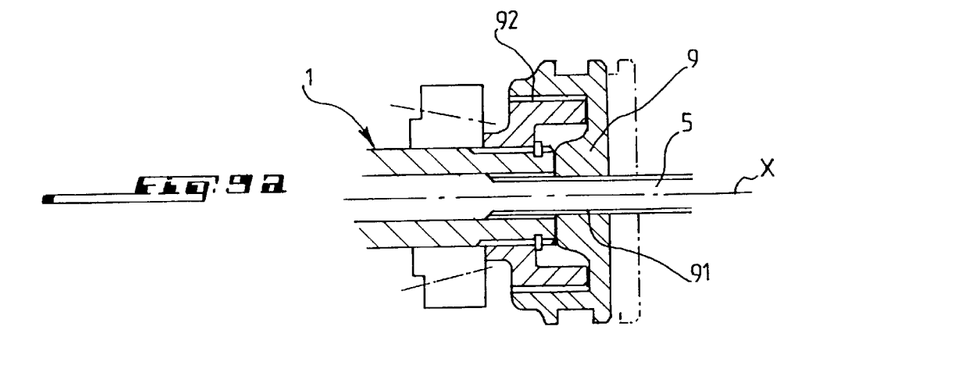
FIG. 9a is a partial sectional view of a control option of a cottering rod according to the embodiment variant shown in FIG. 8b, used in the primary shaft of a gearbox according to the present invention.
Figure 9B:
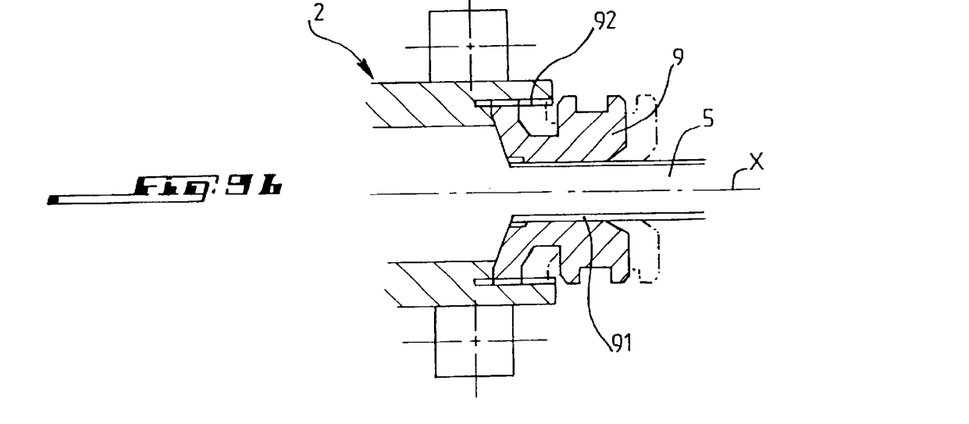
FIG. 9b is a partial sectional view of a control option of a cottering rod according to the embodiment variant shown in FIG. 8b, used in the secondary shaft of a gearbox according to the present invention.

However, it may be suitable to make it possible, in the gearbox of the present invention, to change gears in a nonsequential manner, e.g., to change from third gear to first gear without having to engage second gear, and this possibility is offered by the use of means such as those shown in FIGS. 8b, 9a and 9b.

In this case, the different rows of balls such as 61 through 63 all comprise a same number N of balls, this number being, e.g., equal to five, and the radial protuberance 51 of the corresponding cottering rod 5 or 50 is traversed by axial notches, such as 521, 522, 523, with a number equal to the number of balls and arranged in the same manner, each of these notches forming a housing for the ball that corresponds to it.

Provided that the cottering rod is suitably oriented around its longitudinal axis X, the radial protuberance 51 can thus traverse the transverse plane in which the balls of a same row are arranged without there being the least radial displacement of these balls, which roll in the bottom of the axial notches, such as 521, 522, and 523.

To ensure a correct orientation of the cottering rod 5 or 50 around its longitudinal axis X, this rod must, on the one hand, be synchronized in rotation with the hollow shaft that carries it, and must, on the other hand, be able to undergo an angular displacement, in other words a phase shift, relative to this shaft equal to 36 degrees if the rows of balls comprise five balls, which enables the radial protuberance 51 to radially move, or not, the balls of the row of balls that it finds in the axial position that the cottering rod adopts.

The means permitting this synchronization and this phase shift are shown in FIG. 9a in the case in which the hollow shaft is the primary shaft 1, and FIG. 9b in the case in which the hollow shaft is the secondary shaft 2, these two cases only being distinguished from each other by the fact that the primary shaft has a smaller diameter than that of the secondary shaft, and may require that a different mounting be provided.

Regardless of the mounting adopted, the cottering rod 5, 50 comprises, e.g., in addition to its translation control sleeve 59 (FIG. 7), a phase control sleeve 9, to which this rod is connected in rotation by the axial splines 91, i.e., the splines oriented according to the X axis.

Moreover, the phase control sleeve 9, which may itself be controlled to adopt two different positions according to the axial direction X as indicated in solid lines and in dash-dotted lines in FIG. 9b, is connected in rotation to the corresponding hollow shaft by a helical connection 92.

Under these conditions, the sleeve 9 puts the rod 5 or 50 into rotation with the corresponding hollow shaft, while being capable, by its axial displacement, of introducing an angular displacement of this rod relative to the shaft that carries it, and therefore relative to the balls housed in this shaft, which are then, or not, displaced radially by the protuberance 51 (FIG. 8b) of the cottering rod according to which the sleeve 9 is in its position shown in solid lines (FIGS. 9a and 9b) or shown in dash-dotted lines.

What is claimed is:

1. A gearbox comprising at least: a primary shaft (1) and a secondary shaft (2), one of said shafts forming a first hollow shaft (11, 21) perforated with an axial bore (110, 210); at least two pairs (31, 41 through 36, 46) of gears, each of which comprises an input gear (31 through 36) and an output gear (41 through 46), which engage each other and equip said primary (1) and secondary (2) shafts, respectively; a first cottering rod (5) mounted to be mobile in said axial bore (110, 210) of said first hollow shaft (11, 21) and selectively adopting at least a first or second axial position; and a first set of balls (6) comprising at least first and second rows of balls (61 through 64); said input and output gears (31 through 36; 41 through 46) having between them, for two different pairs of gears, respective ratios that are different from each other, said first and second pairs of gears (31, 41 and 32, 42; 34, 44 and 35, 45) including, respectively, first and second idling gears (31, 32; 44, 45), mounted for rotating on said first hollow shaft (11, 21), and each of which has internal splines (310, 320; 440, 450), said first hollow shaft (11, 21) having first and second rows of orifices (111, 112; 211, 212) emerging, respectively, opposite said splines (310, 440; 320, 450) of said first and second idling gears (31, 44; 32, 45), and in which are respectively engaged said balls of said first and second rows (61, 62), and said first cottering rod (5) having a radial protuberance (51) which selectively engages said balls of said first or second row (61, 62) in said splines of said first or second idling gear (31, 44; 32, 45), according to whether said first cottering rod (5) is in its first or second axial position, the improvement comprising that said gearbox further comprises at least a first cage (7) fixed in rotation relative to said first hollow shaft (11, 21) and arranged between said first hollow shaft (11, 21) and said first and second idling gears (31, 44; 32, 45), wherein said first cage (7) comprises segments (71 through 75) stacked along an axial direction (X) and defining between them a set of gaps (76 through 79) comprising at least first and second gaps (76, 77) opposite which are respectively arranged said balls of said first and second rows (61, 62), wherein said segments (71 through 75) are mounted for sliding according to the axial direction (X) to permit each of said first and second gaps (76, 77) to selectively adopt a minimum width (L0) at which said first and second gaps (76, 77) respectively block said balls of said first and second rows (61, 62) to be engaged, respectively, in the splines of said first and second idling gears (31, 44; 32, 45), and a maximum width (L1) at which said first and second gaps (76, 77) respectively enable said balls of said first and second rows (61, 62) to be engaged, respectively, in the splines of said first and second idling gears (31, 44; 32, 45), and wherein said segments (71 through 75) are mounted for sliding with a total effective clearance less than twice a difference between the maximum and minimum widths, which results in that two said different gaps (76 through 79) never adopt said maximum width (L1) at the same time.

2. Gearbox in accordance with claim 1, wherein said segments of the cage (71 through 75) are enclosed, according to the axial direction (X), between two pretensioned springs (81, 82).

3. Gearbox in accordance with claim 1, wherein said first and second pairs of gears (31, 41 and 32, 42; 34, 44 and 35, 45) include, respectively, first and second connected gears (41 and 42; 34 and 35), engaging, respectively, with said first and second idling gears (31 and 32; 44 and 45), and integral in rotation with the one (13, 23, 22) of said primary and secondary shafts (1, 2), which is not formed by said first hollow shaft (11, 21).

4. Gearbox in accordance with claim 1, wherein said secondary shaft (2) forms a second hollow shaft (22) and carries at least two said idling gears (44, 45), and wherein said second hollow shaft (22) is perforated with an axial bore (220) in which are housed a second covering rod (50), a second set of balls (60), and a cage (70), which are, respectively, equivalent to said first cottering rod (5), said first set of balls (6) and said first cage (7).

5. Gearbox in accordance with claim 4, wherein said first hollow shaft (11, 21) carries said gears (34, 35, 36; 41, 42, 43) which are connected and are integral in rotation with said first hollow shaft (11, 21).

6. Gearbox in accordance with claim 1, wherein the gearbox comprises at least three pairs (31, 41 through 33, 43) of gears, wherein the rows of balls (61 through 63) of said first set of balls (6) comprise at least a same certain number of balls (N), wherein the radial protuberance (51) of said first cottering rod (5) is at least traversed by axial notches (521, 522, 523) in a number (N) equal to the certain number of balls, and each of which forms a housing for one ball, wherein said first cottering rod (5) is connected in rotation, by axial splines (91), to a phase control sleeve (9), which is selectively movable in the axial direction (X), and wherein said phase control sleeve (9) is connected in rotation to said first hollow shaft (11, 21) by a helical connection (92).

7. Gearbox in accordance with claim 1, wherein one of said pairs (30, 40) of gears comprises said input gear (30) and said output gear (40), which engage each other only via a third gear (300).

8. Gearbox in accordance with claim 1, wherein said orifices (111, 112; 211, 212) made in said first hollow shaft (11, 21) are at least arranged in staggered rows.

9. Gearbox in accordance with any one of the preceding claims, wherein said idling gears (31, 32, 33; 44, 45, 46) carried by said first hollow shaft (11, 21) are separated from each other by pin stops (39).

10. Gearbox in accordance with claim 1, wherein said segments (72, 73, 74) of said first cage (7) are indexed in rotation with each other by means of cutouts (721, 741) and complementary tongues (712, 732) engaged in said cutouts (721, 741).

* * * * *